United States Patent
Kolesnikov (10) Patent No.: US 9,535,658 B2
(45) Date of Patent: Jan. 3, 2017

(54) SECURE PRIVATE DATABASE QUERYING SYSTEM WITH CONTENT HIDING BLOOM FILTERS

(71) Applicant: Vladimir Y. Kolesnikov, Jersey City, NJ (US)

(72) Inventor: Vladimir Y. Kolesnikov, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 547 days.

(21) Appl. No.: 13/630,590

(22) Filed: Sep. 28, 2012

(65) Prior Publication Data

US 2014/0108435 A1    Apr. 17, 2014

(51) Int. Cl.
*G06F 17/30* (2006.01)
*G06F 7/24* (2006.01)
(Continued)

(52) U.S. Cl.
CPC ........... *G06F 7/24* (2013.01); *G06F 17/30424* (2013.01); *G06F 21/6227* (2013.01); *H04L 9/008* (2013.01);
(Continued)

(58) Field of Classification Search
CPC .............. G06F 21/6218; G06F 21/6227; G06F 17/30067; G06F 7/24; G06F 17/30424; G06Q 10/10
(Continued)

(56) References Cited

U.S. PATENT DOCUMENTS 5,701,464 A * 12/1997 Aucsmith ............... G06F 21/34
6,804,667 B1 * 10/2004 Martin .............. G06F 17/30489
707/754
(Continued)

FOREIGN PATENT DOCUMENTS

CN      1716842 A    1/2006
JP    H10327141 A    12/1998
(Continued)

OTHER PUBLICATIONS

Pappas et al. (Private Search in the Real World, department of computer science, Columbia University, ACM ASAC Dec. 5-9, 2011).*
(Continued)

*Primary Examiner* — Polina Peach
(74) *Attorney, Agent, or Firm* — Ryan, Mason & Lewis, LLP (57) ABSTRACT

Secure private database querying on a database for a query having a formula evaluation on at least two keywords A and B comprises: a server receiving a Bloom filter tree comprised of encrypted Bloom filters of encrypted keywords from the database, wherein each Bloom filter in the Bloom filter tree is separately masked by a random mask pad P; receiving an encrypted version of the keywords A and B from the client; and obtaining masked Bloom filter indices for the keywords A and B. The client and server participate in secure function evaluation (SFE) with the client. The server has an input comprising the masked Bloom filter indices for the keywords A and B and the client has an input comprising the random mask pad P. The secure function evaluation comprises: removing the random mask pad P from the masked Bloom filter indices input by the server; determining if there is a matching Bloom filter for each of
(Continued)

```
400
410 ─ Server S generates encrypted BF and encrypted BF tree
420 ─ Server S selects a random seed s, and generates a random pad P
430 ─ Server S sends random pad P to client C
440 ─ Server S applies the random pad P to each BF in the BF tree Separately
450 ─ Server S sends the BF tree with each node masked with random pad P to IS
460 ─ Client C generates a query having a formula evaluation on at least two terms A and B (such as "return if keywdA OR keywdB")
470 ─ Client C encrypts keywords A and B and sends encrypted query to Index Server IS
480 ─ Index Server IS looks up corresponding bit positions in the BF and obtains masked BF indices for A and B
490 ─ Index Server IS and Client C engage in secure function evaluation (SFE) with the following private inputs:
        Index Server IS: masked BF indices for A and B
        Client C: mask P to offset encrypted BF indices
495 ─ SFE by Client C and Index Server IS proceeds as follows:
        1. Remove Mask P from input of IS using XOR function:
           (masked indices for A and B) XOR (P) = separate indices for keywords A and B
        2. For each keyword, determine if there is a matching BF
        3. Apply the query formula to determine if the formula is satisfied
        4. Output the result
496 ─ Client C and Index Server IS repeat steps 480-495 as necessary to traverse the BF tree
``` the keywords A and B; and applying the formula evaluation to determine if the formula is satisfied.

18 Claims, 4 Drawing Sheets

(51) Int. Cl.
*G06F 21/62* (2013.01)
*H04L 9/00* (2006.01)
*H04L 9/08* (2006.01)

(52) U.S. Cl.
CPC ......... *H04L 9/0894* (2013.01); *H04L 2209/42* (2013.01)

(58) Field of Classification Search
USPC .................................................. 707/781, 783
See application file for complete search history.

(56) References Cited

U.S. PATENT DOCUMENTS

| | | | |
|---|---|---|---|
| 7,103,025 B1* | 9/2006 | Choksi ................. | H04L 1/1848 370/335 |
| 7,454,418 B1* | 11/2008 | Wang ..................... | G06F 21/564 |
| 8,364,979 B1* | 1/2013 | Ostrovsky ........... | G06F 21/6227 711/154 |
| 8,498,995 B1* | 7/2013 | Gond ...................... | H04L 12/58 707/713 |
| 8,904,176 B2* | 12/2014 | Karp ........................ | G06F 21/34 705/67 |
| 8,949,600 B2* | 2/2015 | Paddon ................. | H04L 9/3242 380/37 |
| 9,179,305 B2* | 11/2015 | Haddad ................. | H04W 12/06 |
| 2005/0166046 A1* | 7/2005 | Bellovin ............... | H04L 9/3218 713/165 |
| 2007/0115986 A1* | 5/2007 | Shankara ..................... | 370/392 |
| 2008/0229103 A1* | 9/2008 | Mutka ....................... | H04L 9/32 713/168 |
| 2010/0064368 A1* | 3/2010 | Stolfo et al. ...................... | 726/24 |
| 2010/0146299 A1* | 6/2010 | Swaminathan ... | G06F 17/30666 713/189 |
| 2010/0262841 A1* | 10/2010 | Ekberg ................. | G06F 21/645 713/193 |
| 2010/0281269 A1* | 11/2010 | Kindarji ............. | G06K 9/00087 713/182 |
| 2013/0010950 A1* | 1/2013 | Kerschbaum ........... | H04L 9/008 380/30 |
| 2013/0046974 A1* | 2/2013 | Kamara .............. | G06F 21/6218 713/165 |
| 2014/0143549 A1* | 5/2014 | Araki .................... | H04L 9/3242 713/175 |

FOREIGN PATENT DOCUMENTS

| | | |
|---|---|---|
| JP | 200705698 A | 3/2007 |
| JP | 2010164899 A | 7/2010 |

OTHER PUBLICATIONS

Raykova et al., Secure Anonymous Database Search, ACM 2009, 12 pages.*
Goh, Secure Indexes, Cryptology ePrint Archive, Oct. 7$^{th}$ 2003, 19 pages.*
Rosario Gennaro, Craig Gentry, and Bryan Parno "Non-interactive Verifiable Computing: Outsourcing Computation to Untrusted Workers", 2010, International Association for Cryptologic Research, pp. 465-482.*
Saibal K. Pal, Puneet Sardana "Bloom Filters & Their Applications", 2012, International Journal of Computer Applications and Technology vol. 1—Issue 1.*
Sasu Tarkoma, Christian Esteve Rothenberg, and Eemil Lagerspetz "Theory and Practice of Bloom Filters for Distributed Systems", 2012, IEEE Communications Surveys & Tutorials, vol. 14, No. 1.*
M. Raykova et al., "Secure Anonymous Database Search," Cloud Computing Security Workshop (CCSW) (Nov. 2009).
V. Pappas, "Private Search in the Real World," Proc. Of the 27th Annual Computer Security Applications Conference (ACSAC) (Dec. 2011).
Eu-Jin Goh, "Secure Indexes," Cryptology ePrint Archive: Report 2003/216 (http://eprint.iacr.org/2003/216).
Mariana Raykova et al., "Secure Anonymous Database Search", Cloud Computing Security Workshop 2009; held at CCS 2009; Chicago, IL, 9-13 Nov. 9, 2009.
Steven M. Bellovin et al. "Privacy-Enhanced Searches Using Encrypted Bloom Filters", International Association for Cryptologic Research, vol. 20040201:185825, pp. 1-12, Feb. 1, 2004.
Ky Lai et al., "An Efficient Bloom Filter Based Solution for Multiparty Private Matching", The HKU Scholars Hub; Sep. 25, 2010.
Goh et al., "Secure Indexes", Internet Citation; pp. 1-20, XP002490169; Oct. 7, 2003.

* cited by examiner

- 410 — Server S generates encrypted BF and encrypted BF tree
- 420 — Server S selects a random seed s, and generates a random pad P
- 430 — Server S sends random pad P to client C
- 440 — Server S applies the random pad P to each BF in the BF tree Separately
- 450 — Server S sends the BF tree with each node masked with random pad P to IS
- 460 — Client C generates a query having a formula evaluation on at least two terms A and B (such as "return if keywdA OR keywdB")
- 470 — Client C encrypts keywords A and B and sends encrypted query to Index Server IS
- 480 — Index Server IS looks up corresponding bit positions in the BF and obtains masked BF indices for A and B
- 490 — Index Server IS and Client C engage in secure function evaluation (SFE) with the following private inputs:
  Index Server IS: masked BF indices for A and B
  Client C: mask P to offset encrypted BF indices
- 495 — SFE by Client C and index Server IS proceeds as follows:
  1. Remove Mask P from input of IS using XOR function:
     (masked indices for A and B) XOR (P) = separate indices for keywords A and B
  2. For each keyword, determine if there is a matching BF
  3. Apply the query formula to determine if the formula is satisfied
  4. Output the result
- 496 — Client C and Indes Server IS repeat steps 480–495 as necessary to traverse the BF tree

SECURE PRIVATE DATABASE QUERYING SYSTEM WITH CONTENT HIDING BLOOM FILTERS

STATEMENT OF GOVERNMENT RIGHTS

The present invention was made in connection with work performed under the Intelligence Advanced Research Projects Activity (IARPA) via Department of the Interior (DOI) Contract No. D11PC20194.

FIELD OF THE INVENTION

The present invention relates generally to privacy protection techniques for secure private database.

BACKGROUND OF THE INVENTION

Secure Anonymous Database Searching has been employed when different parties possess data of mutual interest. See, for example, M. Raykova et al., "Secure Anonymous Database Search," Cloud Computing Security Workshop (CCSW) (Nov. 2009); and V. Pappas et al., "Private Search in the Real World," Proc. of the 27th Annual Computer Security Applications Conference (ACSAC) (Dec. 2011). Generally, secure anonymous database searching techniques allow a client to search information residing on a server without revealing the identity of the client or the content of the query to the server. At the same time, the server is protected in that the query capability is only granted to authorized clients and the clients do not learn anything unrelated to the query.

In one exemplary implementation, the server S encrypts the database with a separate key for each entry and provides the encrypted database to an index server IS. In addition, the server S creates an encrypted search structure that is also given to the index server IS. When a client C wants to query the database, the client C encrypts the query, sends it to the index server IS, and the query is executed blindly by the index server IS using the encrypted search structure.

In order to reduce the leakage of information about the query and the response, Bloom filters (BFs) of encrypted keywords have been used as the search structure. Heterogeneous elements, such as keywords, can be inserted into a Bloom filter. At a later time, a user can check whether a particular element was inserted into the Bloom filter by checking that several bits of the Bloom filter are set to one.

In a secure anonymous database searching system that employs Bloom filters, each encrypted database row that is stored by the index server IS has an associated encrypted Bloom filter. Checking encrypted keywords (supplied by the client C) with the Bloom filter allows the index server IS to determine if that keyword was associated with the corresponding database record, and to return the required records. Since the keywords are encrypted, the index server IS does not learn the content of the query.

Eu-Jin Goh, "Secure Indexes," Cryptology ePrint Archive: Report 2003/216 (http://eprint.iacr.org/2003/216), improves the scalability of such secure anonymous database searching systems by proposing the use of a tree of Bloom filters. Generally, a binary tree is built on top of the Bloom filters corresponding to database rows, with internal nodes being Bloom filters that include all the keywords included in any of the Bloom filters of the sub-tree. The database can now be searched more quickly, since the matching database row is identified by going down the Bloom filter tree.

A need remains for secure anonymous database searching systems that can process more complex queries than just keyword search. In particular, a need remains for secure anonymous database searching systems that can process queries requiring a formula evaluation, such as formulas, range queries, negations and approximations. Yet another need remains for secure anonymous database searching systems that can process queries requiring a formula evaluation without revealing whether each term of the formula is matched by the Bloom filter.

SUMMARY OF THE INVENTION

Generally, methods and apparatus are provided for secure private database querying with content hiding bloom filters. According to one aspect of the invention, a server provides secure private database querying by a client on a database for a query having a formula evaluation on at least two keywords A and B by receiving a Bloom filter tree comprised of encrypted Bloom filters of encrypted keywords from the database, wherein each Bloom filter in the Bloom filter tree is separately masked by a random mask pad P; receiving an encrypted version of the keywords A and B from the client; obtaining masked Bloom filter indices for the keywords A and B; participating in Secure Function Evaluation (SFE) with the client, wherein the server has an input comprising the masked Bloom filter indices for the keywords A and B and wherein the client has an input comprising the random mask pad P and wherein the Secure Function Evaluation comprises the following steps: removing the random mask pad P from the masked Bloom filter indices input by the server; determining if there is a matching Bloom filter for each of the keywords A and B; applying the formula evaluation to determine if the formula is satisfied; and generating a result.

According to another aspect of the invention, the client performs secure private database querying with the server on a database for a query having a formula evaluation on at least two keywords A and B, by providing an encrypted version of the keywords A and B to the server, wherein the server represents the database as a Bloom filter tree comprised of encrypted Bloom filters of encrypted keywords from the database, wherein each Bloom filter in the Bloom filter tree is separately masked by a random mask pad P; participating in Secure Function Evaluation (SFE) with the server, wherein the server has an input comprising masked Bloom filter indices for the keywords A and B from the Bloom filter tree and wherein the client has an input comprising the random mask pad P and wherein the Secure Function Evaluation comprises the following steps: removing the random mask pad P from the masked Bloom filter indices input by the server; determining if there is a matching Bloom filter for each of the keywords A and B; applying the formula evaluation to determine if the formula is satisfied; and generating a result.

The Bloom filters in the Bloom filter tree can be separately masked by the random mask pad P, for example, based on a node index of the Bloom filter. The random mask pad P can be removed from the masked Bloom filter indices input by the server using an XOR function. For example, the random mask pad P can be removed from the masked Bloom filter indices input by the server by applying an XOR function to the masked indices for keywords A and B and separate indices for keywords A and B.

A more complete understanding of the present invention, as well as further features and advantages of the present invention, will be obtained by reference to the following detailed description and drawings.

DETAILED DESCRIPTION

Aspects of the present invention provide secure anonymous database searching methods and systems that can process queries requiring a formula evaluation, such as formulas, range queries, negations and approximations. According to one aspect of the invention, the disclosed secure anonymous database searching methods and systems can process queries requiring a formula evaluation without revealing whether each term of the formula is matched by the Bloom filter.

The above-described techniques of Bloom filters containing encrypted keywords and Bloom filter trees are used as building blocks in a secure anonymous database searching system that employs Secure Function Evaluation (SFE). The Bloom filters are additionally encrypted with a one-time mask pad (which is generated by a server S and provided to a client C). Secure Function Evaluation (SFE) between the client C and an index server IS is used to efficiently decrypt (i.e., take off the one-time mask pad) the Bloom filter and evaluate the query formula, such that the index server IS does not learn the Bloom filter matches.

Figure 1:
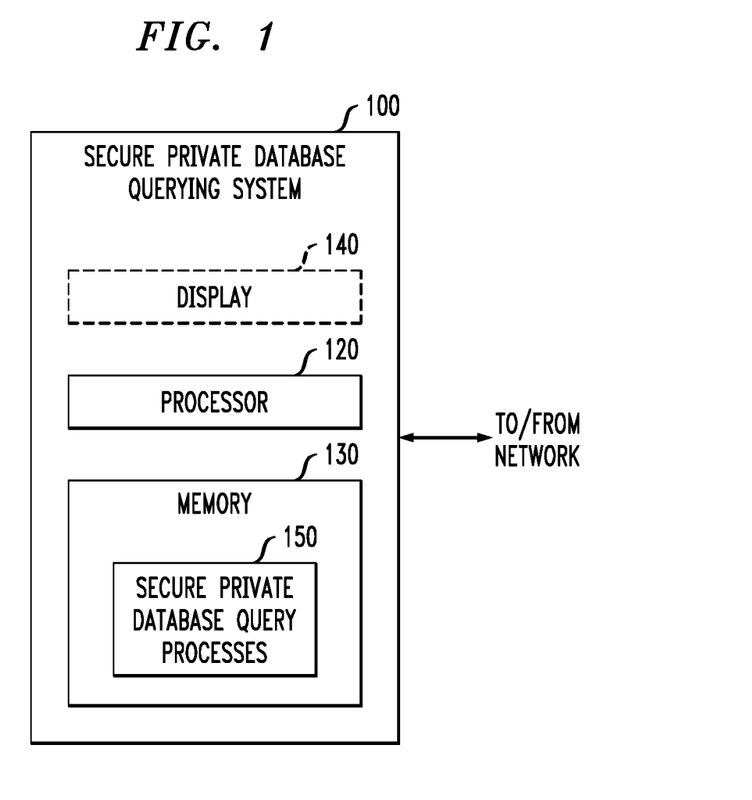
FIG. 1 is a block diagram of an improved generic two-party SFE system that can implement the processes of the present invention.

FIG. 1 is a block diagram of an improved secure private database querying system 100. As shown in FIG. 1, memory 130 configures the processor 120 to implement the improved secure private database query methods, steps, and functions disclosed herein (collectively, shown as 150 in FIG. 1, and discussed further below in conjunction with FIGS. 2 through 4). The memory 130 could be distributed or local and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of computer system 100 can be incorporated into a personal computer, laptop computer, handheld computing device, application-specific circuit or general-use integrated circuit.

Bloom Filters

Figure 2:
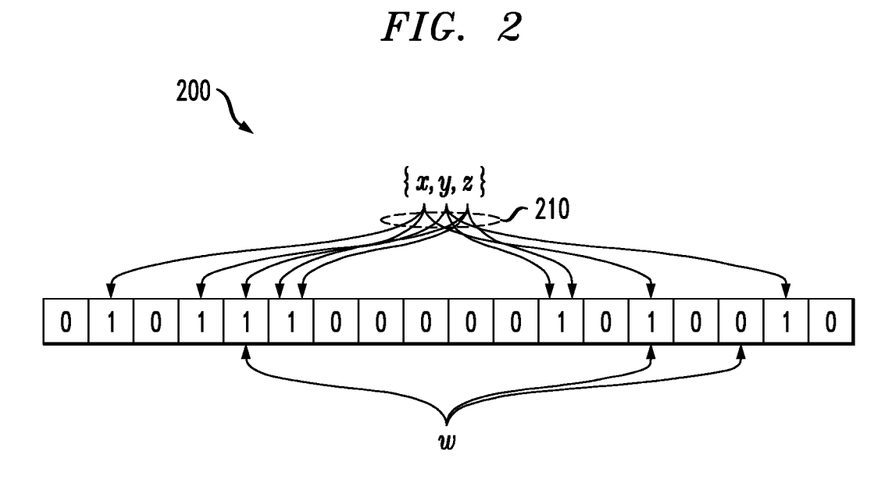
FIG. 2 illustrates an exemplary Bloom filter.

FIG. 2 illustrates an exemplary Bloom filter 200, representing the set {x, y, z}. Generally, Bloom filters are space-efficient probabilistic data structures that can be used to test whether an element is a member of a set. An empty Bloom filter 200 is a bit array of m bits, all set to 0. There must also be k different hash functions defined, each of which maps or hashes some set element to one of the m array positions with a uniform random distribution. To add an element to the Bloom filter 200, it is applied to each of the k hash functions to get k array positions. The bits at all these k positions are set to 1.

To query for an element in the Bloom filter 200 (i.e., to test whether the element is in the set), the element is applied to each of the k hash functions to get k array positions. If any of the bits at these positions are 0, the element is not in the set (if it were, then all the bits would have been set to 1 upon insertion). If all bits at these positions are 1, then the element is in the set (or possibly the bits have by chance been set to 1 during the insertion of other elements, resulting in a false positive).

The arrows 210 in FIG. 2 show the positions in the bit array of the Bloom filter 200 that each set element {x, y, z} is mapped to. The element w is not in the set {x, y, z}, because w hashes to at least one bit-array position in the Bloom filter 200 containing 0. In the exemplary embodiment of FIGS. 2, m=18 and k=3.

Secure Private Database Querying

Figure 3:
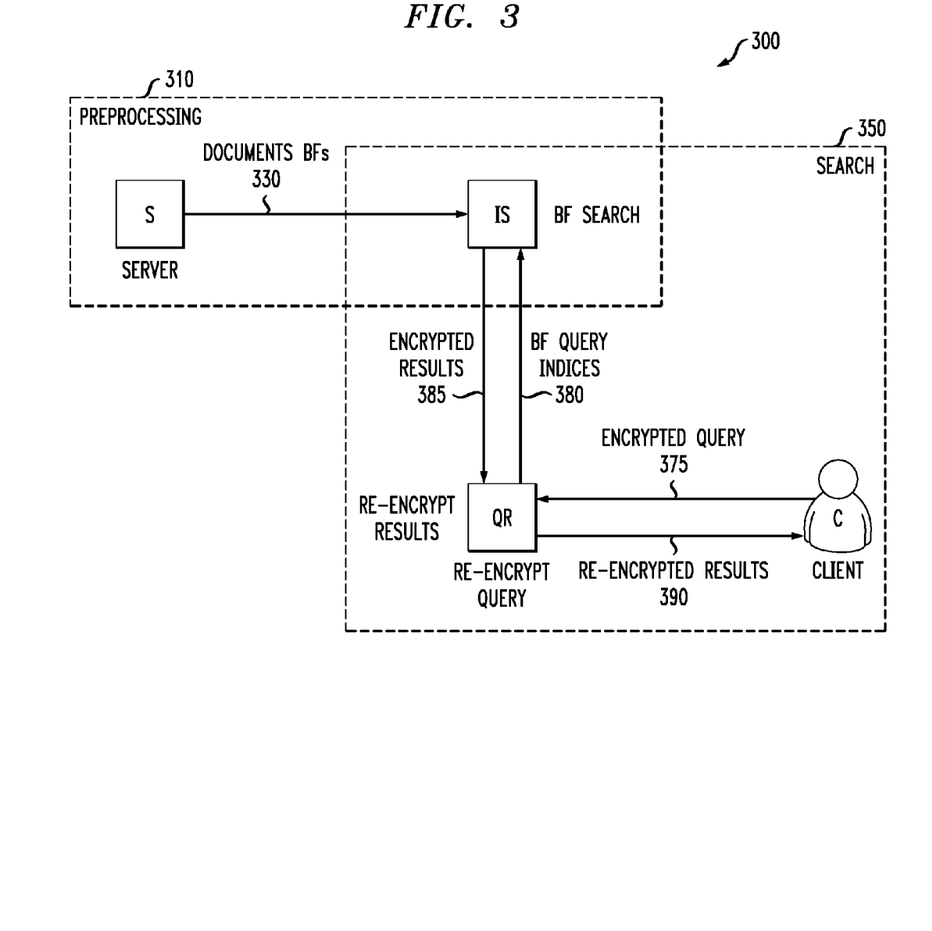
FIG. 3 illustrates an exemplary secure anonymous database search system.

FIG. 3 illustrates an exemplary secure anonymous database search system 300. A client C with one or more keywords can identify the documents of a database owner/server S containing the keywords without learning anything more or revealing his query. The exemplary system 300 involves two semi-trusted parties: an index server IS and an optional query router QR, which facilitate the search. Generally, during a preprocessing phase 310, the server S computes search structures for the database. A Bloom filter per document is built from the encryptions of all words of the document and the document Bloom filters 330 are provided to the index server IS. In addition, each authorized client C receives keys that are used to submit queries and decrypt the results. The query router QR receives corresponding transformation keys for the queries of that client.

To submit a query during a search phase 350, the client C computes an encryption of his query and sends the encrypted ion query 375 to the query router QR. The query router QR verifies that the client C is authorized, re-encrypts the query with the corresponding transformation key, computes and sends the BF indices 380 obtained from the encryption to the index server IS. The index server IS performs search across the Bloom filters it stores, encrypts the identifiers of the matching documents and sends them to the query router QR as encrypted results 385. The query router QR transforms the encryptions and delivers them to the client C as re-encrypted results 390. The client C decrypts the re-encrypted results 390 to obtain his search results.

For a more detailed discussion of exemplary secure anonymous database search systems 300, see, for example, M. Raykova et al., "Secure Anonymous Database Search," Cloud Computing Security Workshop (CCSW) (Nov. 2009); and V. Pappas, "Private Search in the Real World," Proc. of the 27th Annual Computer Security Applications Conference (ACSAC) (Dec. 2011), each incorporated by reference.

Secure Anonymous Database Searching Using SFE

As previously indicated, the above-described techniques of Bloom filters containing encrypted keywords and Bloom filter trees are used as building blocks in a secure anonymous database searching system that employs Secure Function Evaluation (SFE). The Bloom filters are additionally encrypted with a one-time mask pad (which is generated by the server S and provided to the client C). Secure Function Evaluation (SFE) between the client C and the index server IS is used to efficiently decrypt (i.e., take off the one-time mask pad) the Bloom filter and evaluate the query formula, such that the index server IS does not learn the Bloom filter matches.

Two-party general Secure Function Evaluation (SFE) allows two parties to evaluate any function on their respective inputs x and y, while maintaining the privacy of both x and y. Efficient SFE algorithms enable a variety of electronic transactions, previously impossible due to mutual mistrust of participants. For example, SFE algorithms have been employed in auctions, contract signing and distributed database mining applications. The problem of secure computation has been solved for both semi-honest and malicious players. Generally, having access to a semi-honest server resolves the problem of malicious circuit generation. As computation and communication resources have increased, SFE has become truly practical for common use. A malicious SFE model provides a guarantee of complete privacy of the players' inputs. Existing generic two-party SFE algorithms typically employ Garbled Circuits (GCs). For a detailed discussion of GCs, see, for example, Andrew C. Yao, "Protocols for Secure Computations," Proc. 23rd IEEE Symp. on Foundations of Comp. Science, 160- 164, (Chicago, 1982); Andrew C. Yao," "How to Generate and Exchange Secrets," Proc. 27th IEEE Symp. on Foundations of Comp. Science, 162- 167 (Toronto, 1986); and/or Y. Lindell and B. Pinkas, "A Proof of Yao's Protocol for Secure Two-Party Computation, Journal of Cryptology, 22(2):161-188(2009).

Under a Garbled Circuit implementation, a Boolean circuit representing the computed function is encrypted by a first party, and is given to a second party for evaluation. The evaluation proceeds under encryption, and hence the second party cannot deviate from the protocol. GC is secure against a malicious circuit evaluator and a semi-honest circuit constructor, therefore the semi-honest server S generates the Garbled Circuit for the chosen function (as communicated to S by both clients). As for inputs, OT extension can be used to secure against malicious receivers and semi-honest server. See, e.g., D. Harnik et al., "OT-Combiners via Secure Computation," TCC $5^{th}$ Theory of Cryptography Conference 2008 (Mar. 2008), Lecture Notes in Computer Science, Vol. 4948, 393 -411 (2008); and/or Y. Ishai et al., "Extending Oblivious Transfers Efficiently," Advances in Cryptology - CRYPTO 2003 (Aug. 2003), Lecture Notes in Computer Science, Vol. 2729, 145-161 (2003).

Figure 4:
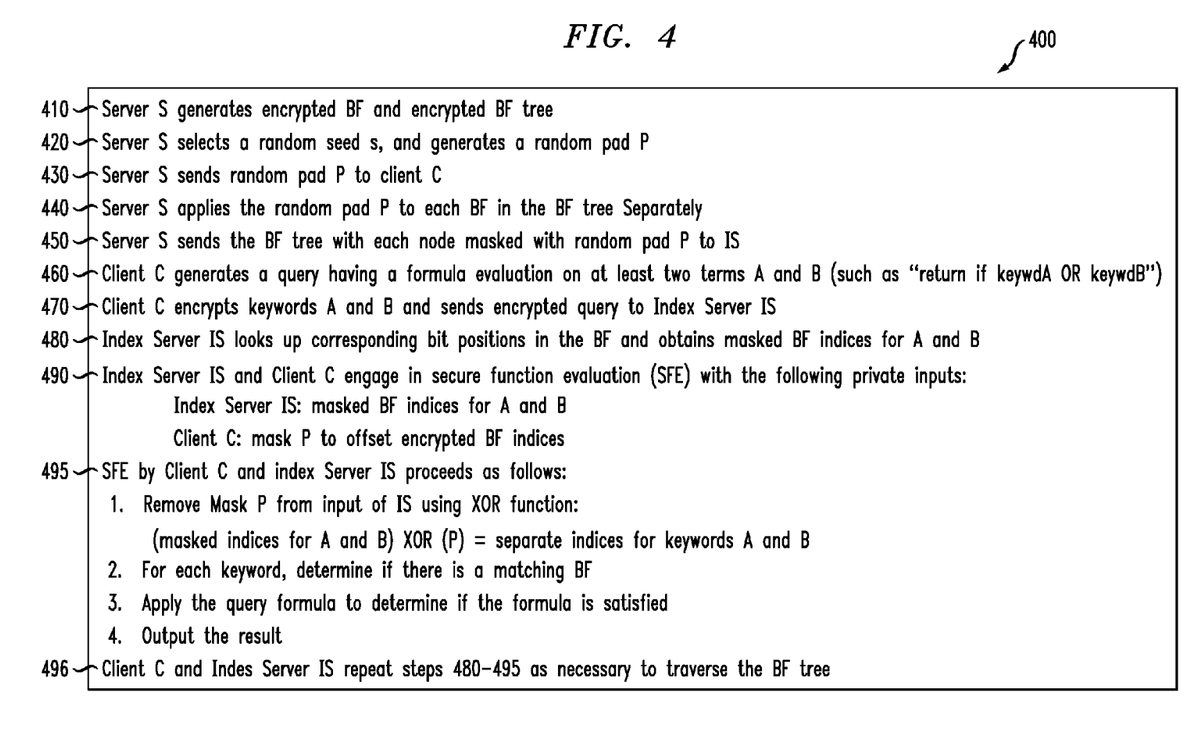
FIG. 4 illustrates pseudo code for an exemplary implementation of a secure private database querying process incorporating aspects of the present invention.

FIG. 4 illustrates pseudo code for an exemplary implementation of a secure private database querying process 400 incorporating aspects of the present invention. As shown in FIG. 4, the server S initially generates encrypted Bloom filters and an encrypted Bloom filter tree during step 410. The server S selects a random seed s, and generates a random mask pad P during step 420.

During step 430, the server S sends the random mask pad P to the client C. The server S applies the random mask pad P to each Bloom filter in the Bloom filter tree separately during step 440. A different pad P can be applied to each Bloom filter, for example, based on the node index of the Bloom filter. The server S then sends the Bloom filter tree with each node masked with the random pad P to the index server IS during step 450.

The client C generates a query during step 460 having a formula evaluation on at least two terms A and B (such as "return if keywdA OR keywdB"). The client C encrypts the keywords A and B and sends the encrypted query to the index server IS during step 470.

During step 480, the index server IS looks up the corresponding bit positions in the Bloom filter and obtains masked Bloom filter indices for keywords A and B. The index server IS cannot make a determination on whether there is a match on any of the two terms, since the Bloom filter is masked with the random pad P.

The index server IS and client C engage in Secure Function Evaluation (SFE) during step 490 with the following private inputs:

Index Server IS: masked Bloom filter indices for A and B; and

Client C: mask pad P to offset encrypted Bloom filter indices for A and B.

The SFE by the client C and the index server IS proceeds during step 495 as follows:

i. The Mask P is removed from the input of the index server IS using an XOR function, as follows:

(Masked Indices for A and B) XOR (P)=separate indices for keywords A and B;

ii. For each keyword, determine if there is a matching Bloom filter;

iii. Apply the query formula to determine if the formula is satisfied; and iv. Output the result.

In this manner, a secure anonymous database searching system is provided that can process queries requiring a formula evaluation without revealing whether each term of the formula is matched by the Bloom filter.

During step 496, the client C and the index server IS repeat steps 480-495 as necessary to traverse the BF tree.

System and Article of Manufacture Details

While FIG. 4 shows an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. method performed by a server for secure private database querying by a client on a database for a query having a formula evaluation on at least two keywords A and B, comprising:
   receiving a Bloom filter tree comprised of encrypted Bloom filters of encrypted keywords from the database, wherein each Bloom filter in the Bloom filter tree is separately masked by a random mask pad P;
   receiving an encrypted version of the at least two keywords A and B from the client;
   evaluating bit positions of the keywords A and B in the Bloom filter to obtain masked Bloom filter indices for the keywords A and B;
   participating in Secure Function Evaluation (SFE) with the client, wherein the Secure Function Evaluation employs at least one garbled circuit representing the formula, wherein the server has an input comprising the masked Bloom filter indices for the at least two keywords A and B and wherein the client has an input comprising the random mask pad P and wherein the Secure Function Evaluation performed by the server with the client comprises the following steps:
   removing the random mask pad P from the masked Bloom filter indices input by the server;
   determining when there is a matching Bloom filter for each of the at least two keywords A and B;
   applying the formula evaluation to determine when the formula is satisfied; and
   generating a result, wherein the result does not reveal whether each term of the formula is matched by the Bloom filter tree.

2. The method of claim 1, wherein each of the Bloom filters in the Bloom filter tree is separately masked by a random mask pad P based on a node index of the Bloom filter.

3. The method of claim 1, wherein the step of removing the random mask pad P from the masked Bloom filter indices input by the server further employs an XOR function.

4. The method of claim 1, wherein the step of removing the random mask pad P from the masked Bloom filter indices input by the server further comprises applying an XOR function to the masked indices for the at least two keywords A and B and separate indices for the at least two keywords A and B.

5. A tangible machine-readable recordable storage medium for secure private database querying by a client on a database for a query having a formula evaluation on the at least two keywords A and B, wherein one or more software programs when executed by one or more processing devices implement the steps of the method of claim 1.

6. A method performed by a client for secure private database querying with a server on a database for a query having a formula evaluation on at least two keywords A and B, comprising:
   providing an encrypted version of the at least two keywords A and B to the server, wherein the server represents the database as a Bloom filter tree comprised of encrypted Bloom filters of encrypted keywords from the database, wherein each Bloom filter in the Bloom filter tree is separately masked by a random mask pad P;
   participating in Secure Function Evaluation (SFE) with the server, wherein the Secure Function Evaluation employs at least one garbled circuit representing the formula, wherein the server evaluates bit positions of the at least two keywords A and B in the Bloom filter to obtain an input comprising masked Bloom filter indices for the at least two keywords A and B from the Bloom filter tree and wherein the client has an input comprising the random mask pad P and wherein the Secure Function Evaluation performed by the client with the server comprises the following steps:
   removing the random mask pad P from the masked Bloom filter indices input by the server;
   determining when there is a matching Bloom filter for each of the at least two keywords A and B;
   applying the formula evaluation to determine when the formula is satisfied; and
   generating a result, wherein the result does not reveal whether each term of the formula is matched by the Bloom filter tree.

7. The method of claim 6, wherein each of the Bloom filters in the Bloom filter tree is separately masked by a random mask pad P based on a node index of the Bloom filter.

8. The method of claim 6, wherein the step of removing the random mask pad P from the masked Bloom filter indices input by the server further employs an XOR function.

9. The method of claim 6, wherein the step of removing the random mask pad P from the masked Bloom filter indices input by the server further comprises applying an XOR function to the masked indices for the at least two keywords A and B and separate indices for the at least two keywords A and B.

10. A tangible machine-readable recordable storage medium for secure private database querying with a server on a database for a query having a formula evaluation on the at least two keywords A and B, wherein one or more software programs when executed by one or more processing devices implement the steps of the method of claim 6.

11. A server system for secure private database querying by a client on a database for a query having a formula evaluation on at least two keywords A and B, comprising:
a memory; and
at least one hardware device, coupled to the memory, operative to:
receive a Bloom filter tree comprised of encrypted Bloom filters of encrypted keywords from the database, wherein each Bloom filter in the Bloom filter tree is separately masked by a random mask pad P;
receive an encrypted version of the at least two keywords A and B from the client;
evaluate bit positions of the keywords A and B in the Bloom filter to obtain masked Bloom filter indices for the at least two keywords A and B;
participate in Secure Function Evaluation (SFE) with the client, wherein the Secure Function Evaluation employs at least one garbled circuit representing the formula, wherein the server has an input comprising the masked Bloom filter indices for the at least two keywords A and B and wherein the client has an input comprising the random mask pad P and wherein the Secure Function Evaluation performed by the server with the client comprises the following steps:
removing the random mask pad P from the masked Bloom filter indices input by the server;
determining when there is a matching Bloom filter for each of the at least two keywords A and B;
applying the formula evaluation to determine when the formula is satisfied; and
generating a result, wherein the result does not reveal whether each term of the formula is matched by the Bloom filter tree.

12. The server system of claim 11, wherein each of the Bloom filters in the Bloom filter tree is separately masked by a random mask pad P based on a node index of the Bloom filter.

13. The server system of claim 11, wherein the random mask pad P is removed from the masked Bloom filter indices input by the server using an XOR function.

14. The server system of claim 11, wherein the random mask pad P is removed from the masked Bloom filter indices input by applying an XOR function to the masked indices for the at least two keywords A and B and separate indices for the at least two keywords A and B.

15. A client system for secure private database querying by a client on a database for a query having a formula evaluation on at least two keywords A and B, comprising:
a memory; and
at least one hardware device, coupled to the memory, operative to:
provide an encrypted version of the at least two keywords A and B to the server, wherein the server represents the database as a Bloom filter tree comprised of encrypted Bloom filters of encrypted keywords from the database, wherein each Bloom filter in the Bloom filter tree is separately masked by a random mask pad P;
participate in Secure Function Evaluation (SFE) with the server, wherein the Secure Function Evaluation employs at least one garbled circuit representing the formula, wherein the server evaluates bit positions of the at least two keywords A and B in the Bloom filter to obtain an input comprising masked Bloom filter indices for the at least two keywords A and B from the Bloom filter tree and wherein the client has an input comprising the random mask pad P and wherein the Secure Function Evaluation performed by the client with the server comprises the following steps:
removing the random mask pad P from the masked Bloom filter indices input by the server;
determining when there is a matching Bloom filter for each of the at least two keywords A and B;
applying the formula evaluation to determine when the formula is satisfied; and
generating a result, wherein the result does not reveal whether each term of the formula is matched by the Bloom filter tree.

16. The client system of claim 15, wherein each of the Bloom filters in the Bloom filter tree is separately masked by a random mask pad P based on a node index of the Bloom filter.

17. The client system of claim 15, wherein the random mask pad P is removed from the masked Bloom filter indices input by the server using an XOR function.

18. The client system of claim 15, wherein the random mask pad P is removed from the masked Bloom filter indices input by applying an XOR function to the masked indices for the at least two keywords A and B and separate indices for the at least two keywords A and B.

* * * * *

UNITED STATES PATENT AND TRADEMARK OFFICE
CERTIFICATE OF CORRECTION

PATENT NO.        : 9,535,658 B2                              Page 1 of 1
APPLICATION NO.   : 13/630590
DATED             : January 3, 2017
INVENTOR(S)       : Vladimir Y. Kolesnikov It is certified that error appears in the above-identified patent and that said Letters Patent is hereby corrected as shown below:

In the Specification

Column 5, Line 17, replace "Andrew C. Yao," "How to Generate and" with --Andrew C. Yao, "How to Generate and--.

Column 5, Line 21, replace "Two-Party Computation, Journal of Cryptology," with --Two-Party Computation," Journal of Cryptology,--.

In the Claims

In Claim 1, Line 33, replace "1. method performed by a" with --1. A method performed by a--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*